US012671897B2

(12) United States Patent
Yoshimura

(10) Patent No.: US 12,671,897 B2
(45) Date of Patent: Jun. 30, 2026

(54) IMAGE CAPTURING APPARATUS CAPABLE OF PERFORMING PHOTOGRAPHING AT DESIRED PHOTOGRAPHING TIMING, METHOD OF CONTROLLING IMAGE CAPTURING APPARATUS, AND STORAGE MEDIUM

(71) Applicant: CANON KABUSHIKI KAISHA, Tokyo (JP)

(72) Inventor: Hidemasa Yoshimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 147 days.

(21) Appl. No.: 18/673,663

(22) Filed: May 24, 2024

(65) Prior Publication Data

US 2024/0422429 A1 Dec. 19, 2024

(30) Foreign Application Priority Data

Jun. 14, 2023 (JP) ................................. 2023-097838

(51) Int. Cl.
*H04N 23/667* (2023.01)
*H04N 23/61* (2023.01)
*H04N 23/68* (2023.01)

(52) U.S. Cl.
CPC ........... *H04N 23/667* (2023.01); *H04N 23/61* (2023.01); *H04N 23/6812* (2023.01)

(58) Field of Classification Search
CPC ........... H04N 23/6812; H04N 5/23293; H04N 23/61; H04N 23/667; H04N 5/23235
See application file for complete search history.

(56) References Cited

U.S. PATENT DOCUMENTS

| | | | | |
|---|---|---|---|---|
| 2012/0327269 A1* | 12/2012 | Hwang | ................ | H04N 23/611 |
| | | | | 348/222.1 |
| 2017/0019604 A1* | 1/2017 | Kim | ..................... | H04N 1/2112 |
| 2021/0289144 A1* | 9/2021 | Suzuki | ................ | H04N 23/695 |

FOREIGN PATENT DOCUMENTS

| | | |
|---|---|---|
| JP | 2019129474 A | 8/2019 |
| JP | 2022059858 A | 4/2022 |

* cited by examiner

*Primary Examiner* — Xi Wang
(74) *Attorney, Agent, or Firm* — Cowan, Liebowitz & Latman, P.C.

(57) ABSTRACT

An image capturing apparatus that is capable of performing photographing without missing a desired photographing timing when performing photographing from a moving body according to a photographing instruction provided from a photographer. The image capturing apparatus has a pre-capture function. A position information acquisition section acquires position information of the image capturing apparatus. A controller calculates a moving speed of the image capturing apparatus based on the position information. In a case where the moving speed is equal to or higher than a predetermined speed, the pre-capture function is set to ON.

24 Claims, 9 Drawing Sheets

301 MOVING SPEED

300b

101

304
PHOTOGRAPHING
DIRECTION

303

400(103,111)

302

IMAGE CAPTURING APPARATUS CAPABLE OF PERFORMING PHOTOGRAPHING AT DESIRED PHOTOGRAPHING TIMING, METHOD OF CONTROLLING IMAGE CAPTURING APPARATUS, AND STORAGE MEDIUM

BACKGROUND OF THE INVENTION

Field of the Invention

The present invention relates to an image capturing apparatus, a method of controlling the image capturing apparatus, and a storage medium, and more particularly to an image capturing apparatus that has a pre-capture function, a method of controlling the image capturing apparatus, and a storage medium.

Description of the Related Art

Conventionally, in a case where a photographer photographs a building or scenery, in which the photographer is interested, using a camera from a moving vehicle, the timing of providing a photographing instruction by pressing a release switch is sometimes delayed because the moving speed of the camera is high, and as a result, the photographer misses the photographing timing. Further, in a case where a photographer performs photographing using a camera mounted e.g. on a moving drone by remote control, the timing of providing the photographing instruction is also sometimes delayed because the moving speed of the camera is high, and as a result, the photographer misses the photographing timing. Thus, in a case where the camera is moving, the photographer is liable to miss the photographing timing.

In a case where a camera is mounted on a moving body and is moving as mentioned above, conventional techniques described below are known as effective for photographing.

For example, Japanese Laid-Open Patent Publication (Kokai) No. 2019-129474 discloses a technique that, by dividing a photographing area into two areas, which are different in photographing conditions, at the start of photographing, and synthesizing images captured with two photographing parameters for the respective areas, it is possible to generate an image photographed with the parameters suitable for the respective areas. By using this technique, it is possible to record an image in a moving vehicle, which is preferable for both of a view inside the vehicle and a view from a vehicle window.

Further, Japanese Laid-Open Patent Publication (Kokai) No. 2022-59858 discloses a technique for controlling the photographing timing of an image capturing apparatus based on photographing conditions for specifying a timing at which the image capturing apparatus performs photographing and a moving speed of the image capturing apparatus. By using the technique, it is possible to properly control photographing performed by the image capturing apparatus mounted on a moving body according to a moving speed.

However, the conventional techniques disclosed in Japanese Laid-Open Patent Publication (Kokai) No. 2019-129474 and Japanese Laid-Open Patent Publication (Kokai) No. 2022-59858 cannot solve a problem that a photographer misses a desired photographing timing when providing a photographing instruction.

In Japanese Laid-Open Patent Publication (Kokai) No. 2019-129474, although it is possible to record, in a moving vehicle, an image which is preferable for both a view inside the vehicle and a view from a vehicle window, it is impossible to correct the photographing timing.

In Japanese Laid-Open Patent Publication (Kokai) No. 2022-59858, a photographing control device has acquiring means for acquiring photographing conditions for specifying a timing at which the image capturing apparatus performs photographing and is capable of controlling the photographing timing of the image capturing apparatus based on the photographing conditions and the moving speed of the moving body. However, since the photographing timing is determined based on the photographing conditions and the moving speed of the moving body, it is impossible to perform photographing at a timing at which the photographer provides the photographing instruction.

SUMMARY OF THE INVENTION

The present invention provides an image capturing apparatus that is capable of performing photographing without missing a desired photographing timing when performing photographing from a moving body according to a photographing instruction provided from a photographer, a method of controlling the image capturing apparatus, and a storage medium.

In a first aspect of the present invention, there is provided an image capturing apparatus having a pre-capture function, including at least one processor; and a memory coupled to the at least one processor storing instructions that, when executed by the processor, cause the processor to function as: a position information acquisition unit configured to acquire position information of the image capturing apparatus, a moving speed calculation unit configured to calculate a moving speed of the image capturing apparatus based on the position information, and a switching unit configured to switch the pre-capture function to ON in a case where the moving speed is equal to or higher than a predetermined speed.

In a second aspect of the present invention, there is provided an image capturing apparatus having a pre-capture function, including a live view image capturing unit configured to acquire a plurality of frame images each captured at a predetermined image capturing interval by live view image capturing, at least one processor; and a memory coupled to the at least one processor storing instructions that, when executed by the processor, cause the processor to function as: a vector calculation unit configured to calculate respective motion vectors of a plurality of objects included in an angle of view of the image capturing apparatus based on the plurality of frame images, and a switching unit configured to switch the pre-capture function to ON in a case where out of the calculated motion vectors, a predetermined number or more of motion vectors each have a magnitude equal to or larger than a predetermined value and are in the same direction.

According to the present invention, it is possible to perform photographing without missing a desired photographing timing when photographing is performed from a moving body according to a photographing instruction provided by a photographer.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
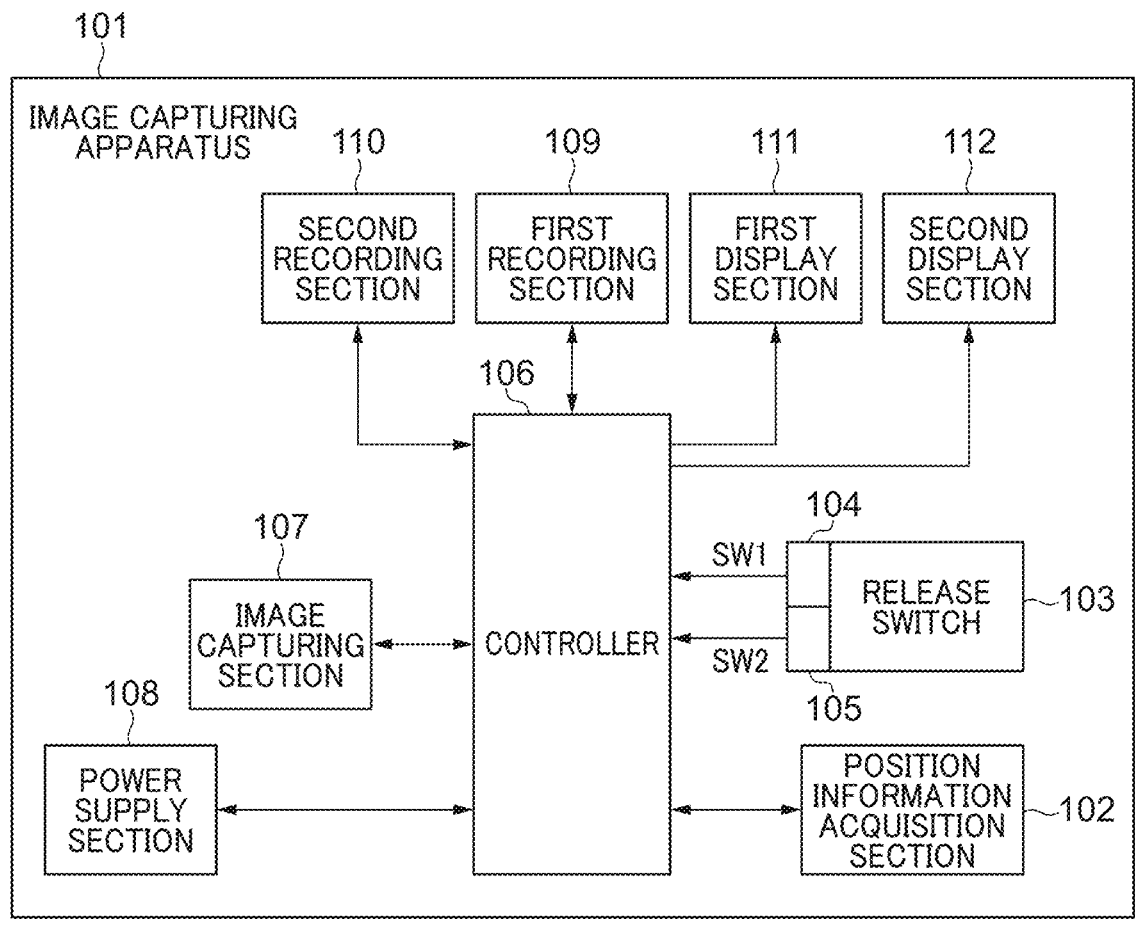
FIG. 1 is a block diagram showing a hardware configuration of an image capturing apparatus according to a first embodiment of the present invention.

FIG. 1 is a block diagram showing a hardware configuration of an image capturing apparatus 101 according to a first embodiment of the present invention.

The image capturing apparatus 101 includes a position information acquisition section 102, a release switch 103, a first shutter switch 104, a second shutter switch 105, a controller 106, an image capturing section 107, and a power supply section 108. The image capturing apparatus 101 further includes a first recording section 109, a second recording section 110, a first display section 111, and a second display section 112.

The position information acquisition section 102 (position information acquisition unit) can detect position information of the image capturing apparatus 101 and outputs the detected position information to the controller 106 as a position information signal. As the position information acquisition section 102, the Global Positioning System (GPS), for example, is used, but this is not limitative. The position information acquisition section 102 is connected to the controller 106. The position information acquisition section 102 is configured to start detection of position information upon receiving a position information measurement start signal from the controller 106 and does not detect position information before the signal is received. Note that the position information acquisition section 102 can be disposed not within the image capturing apparatus 101 but in the outside of the image capturing apparatus 101, for example, in an electronic device connected to the image capturing apparatus 101.

Figure 4:
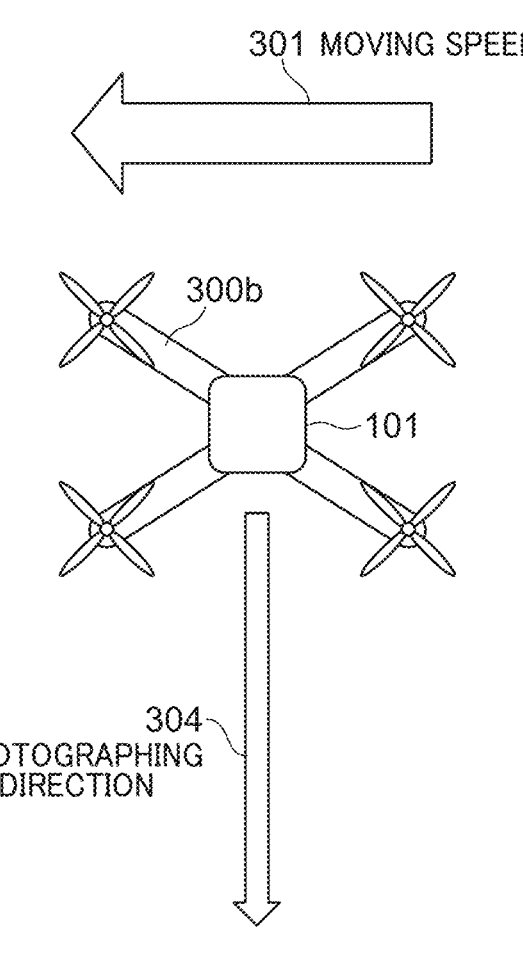
FIG. 4 is a diagram showing a second use case of the image capturing apparatus shown in FIG. 1.
Figure 4:
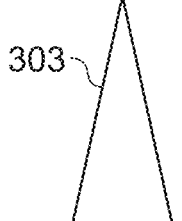
Figure 4:
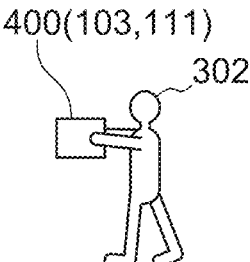

The release switch 103 is a switch pressed by a photographer (user) for instructing photographing. The release switch 103 can be provided on a top surface of the image capturing apparatus 101 as shown FIG. 2, referred to hereinafter, or can be provided outside the image capturing apparatus 101 as shown in FIG. 4, referred to hereinafter. Information on an operation performed by the photographer with respect to the release switch 103 is sent to the controller 106 by wired or wireless communication as a first shutter switch signal SW1 or a second shutter switch signal SW2, referred to hereinafter.

The first shutter switch 104 is turned on by a half operation of the release switch 103, i.e. a so-called half pressing operation (pre-capture start instruction) and generates the first shutter switch signal SW1. Upon receipt of the first shutter switch signal SW1, the controller 106 starts operations of auto-focus processing, auto-exposure processing, auto-white balance processing, flash pre-emission processing, and so forth.

The second shutter switch 105 is turned on by a complete operation of the release switch 103, i.e. a so-called full pressing operation (normal photographing instruction) and generates the second shutter switch signal SW2. Upon receipt of the second shutter switch signal SW2, the controller 106 starts a series of photographing processing operations from readout of signals from the image capturing section 107 to writing of image data into the second recording section 110.

The controller 106 controls the entire system of the image capturing apparatus 101 and is implemented e.g. by a system Large-Scale Integration (LSI) circuit and a dynamic random access memory (DRAM).

Further, the controller 106 performs control with respect to the position information acquisition section 102, the image capturing section 107, the power supply section 108, the first recording section 109, the second recording section 110, the first display section 111, and the second display section 112.

Upon receipt of the position information signal from the position information acquisition section 102 and the first shutter switch signal SW1 or the second shutter switch signal SW2 from the release switch 103, the controller 106 outputs a control signal to the image capturing section 107. With this control signal, for example, the controller 106 provides a photographing instruction to the image capturing section 107. Further, in a case where a pre-capture function is set to ON, the controller 106 starts pre-capture in response to a half pressing operation of the release switch 103 and performs normal photographing in response to a full pressing operation of the release switch 103, thereby acquiring pre-captured images and a normal photographed image. Note that the pre-capture itself is a known technique, and hence detailed description thereof is omitted except description related to the present embodiment.

The image capturing section 107 is an image sensor, such as a complementary metal-oxide-semiconductor (CMOS) sensor or a charge-coupled device (CCD) sensor, and is connected to the controller 106.

The image capturing section 107 captures an object image by adjusting the focus, performing a photographing operation, and so forth, according to respective control signals from the controller 106. The image capturing section 107 transmits an acquired video to the controller 106.

The power supply section 108 converts a voltage received from a supply source, such as a battery or an AC adapter, not shown, to a desired voltage and supplies the converted voltage to electronic components used in the image capturing apparatus 101.

The first recording section 109 is a volatile memory which cannot hold information unless power is supplied, and functions as a buffer for loading constants, variables, and so forth for the operation of the controller 106. Further, when a half pressing operation of the release switch 103 is performed before a predetermined time period elapses after the pre-capture function is set to ON, the pre-capture is started, and captured frame images are temporarily stored in the first recording section 109 as pre-captured images.

The second recording section 110 is a nonvolatile memory capable of holding information even when power is not supplied, and stores programs, settings, and so forth, for controlling a variety of operations of the image capturing apparatus 101. Further, in a case where pre-capture is being performed, when the release switch 103 is further pressed to perform a full pressing operation before a predetermined time period elapses after the start of the pre-capture, normal photographing is performed, whereby a normal photographed image and the pre-captured images stored in the first recording section 109 are stored in the second recording section 110.

The first display section 111 is implemented e.g. by a liquid crystal display and displays a graphical user interface (GUI) and results of a variety of processing operations performed by the controller 106. The first display section 111 can be provided on a rear surface of the image capturing apparatus 101 as shown in FIG. 2, referred to hereinafter, or can be provided outside the image capturing apparatus 101 as shown in FIG. 4, referred to hereinafter.

The second display section 112 is implemented e.g. by an electronic viewfinder and displays a GUI, a scenery captured by the image capturing section 107, and so forth. Note that as shown in FIG. 4, referred to hereinafter, in a case where a photographer remotely controls the image capturing apparatus 101, the second display section 112 is not necessarily required to be provided.

Figure 2:
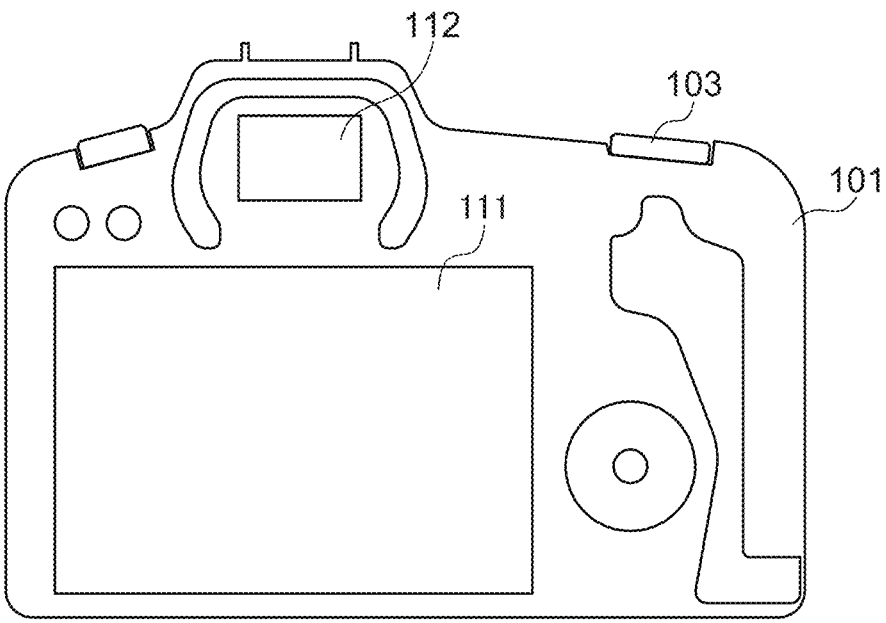
FIG. 2 is an appearance view of the image capturing apparatus shown in FIG. 1, as viewed from the rear.

FIG. 2 is an appearance view of the image capturing apparatus 101, as viewed from the rear. The top surface has the release switch 103, and the rear surface has the first display section 111 and the second display section 112. As described above, although the release switch 103 is disposed on the top surface of the image capturing apparatus 101 as shown in FIG. 2, this is not limitative, but, for example, the release switch 103 can be disposed outside the image capturing apparatus 101. Although the first display section 111 is provided on the rear surface of the image capturing apparatus 101 as shown in FIG. 2, this is not limitative, but, for example, the first display section 111 can be provided outside the image capturing apparatus 101.

Figure 3:
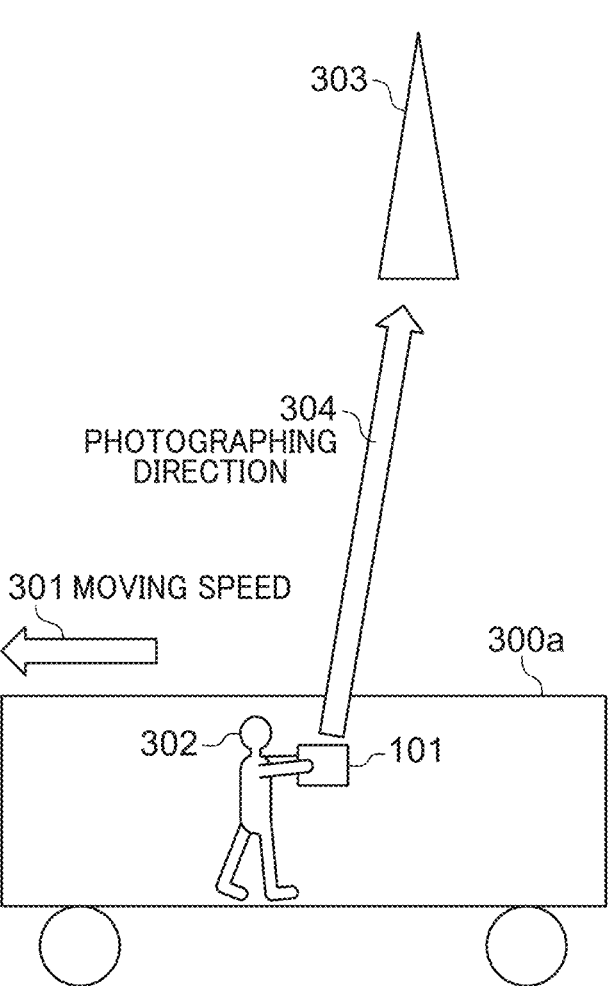
FIG. 3 is a diagram showing a first use case of the image capturing apparatus shown in FIG. 1.

FIG. 3 is a diagram showing a first use case of the image capturing apparatus 101. FIG. 4 is a diagram showing a second use case of the image capturing apparatus 101. Note that these use cases are described by way of example, and the use case is not limited to these. Note that in the following description, in a case where moving bodies 300a and 300b, shown in the respective use cases by way of example, are collectively referred to, they are each referred to as the moving body 300.

As shown in FIG. 3, in the first use case, a photographer 302 on the moving body 300a moving at a moving speed 301 photographs a main object 303 on the outside using the image capturing apparatus 101.

The moving body 300a is a train, a bus, or the like, but is not limited to this. The photographer 302 photographs the main object 303 using the image capturing apparatus 101 from the inside (for example, the inside of the train) or a surface (for example, an open deck provided on the upper part of a bus) of the moving body 300a. The photographing direction at this time is a photographing direction 304.

As shown in FIG. 4, in the second use case, the photographer 302 photographs the main object 303 using a photographing instruction device 400 wirelessly connected to the image capturing apparatus 101 which is mounted on the moving body 300b moving at the moving speed 301. The moving body 300b is e.g. a drone but is not limited to this. The photographer 302 remotely controls the moving body 300b from the external photographing instruction device 400. The photographing instruction device 400 is provided with the first display section 111, the release switch 103, and a proportional system (not shown) for controlling flight of the moving body 300b. The photographer causes the live view image received from the image capturing apparatus 101 to be displayed on the first display section 111, and when the image capturing apparatus 101 obtains a desired angle of view, if the photographer fully presses the release switch 103, the photographing instruction device 400 provides a normal photographing instruction to the image capturing apparatus 101 by wireless communication. Upon receipt of the normal photographing instruction, the image capturing apparatus 101 photographs the main object 303. The photographing direction at this time is the photographing direction 304. Further, in a case where the pre-capture function of the image capturing apparatus 101 is set to ON, if the photographer half-presses the release switch 103, the photographing instruction device 400 provides a pre-capture start instruction to the image capturing apparatus 101 by wireless communication. Upon receipt of the pre-capture start instruction, the image capturing apparatus 101 starts pre-capture.

The photographing process performed by the image capturing apparatus 101 will be described below with reference to FIG. 5.

The present process is executed by the controller 106 reading a program from the second recording section 110 and loading the program into the DRAM in the controller 106.

In a step S100, when it is detected that the photographer has pressed a power switch (not shown) of the image capturing apparatus 101, the controller 106 starts the image capturing apparatus 101, controls the image capturing section 107 (live view image capturing unit) to start live view image capturing, and then proceeds to a step S101.

In the step S101, the controller 106 transmits a position information measurement start signal to the position information acquisition section 102. Upon receipt of the position information measurement start signal, the position information acquisition section 102 starts to acquire position information. Thereafter, the position information acquisition section 102 always continues to transmit a position information signal to the controller 106 until the power switch is turned off.

In a step S102, the controller 106 (moving speed calculation unit/switching unit) calculates a moving speed of the image capturing apparatus 101 based on the position information signal transmitted from the position information acquisition section 102 and determines whether or not the moving speed is higher than a predetermined speed. If the moving speed is higher than the predetermined speed (YES to the step S102), the controller 106 proceeds to a step S103, whereas if the moving speed is equal to or lower than the predetermined speed (NO to the step S102), the controller 106 proceeds to a step S112. Here, the magnitude of the predetermined speed can be a value at which it is possible to determine whether the movement of the image capturing apparatus 101 is caused by the movement of the moving body 300, or caused by the movement of a person carrying the image capturing apparatus 101, and for example, the predetermined speed is set to a speed at which a person walks at a quick pace (for example, 1.3 m per second).

In the step S103, the controller 106 calculates an amount per unit time of movement of the main object 303 included in the angle of view (hereinafter referred to as the in-view-angle object movement amount), and determines whether or not the in-view-angle object movement amount is equal to or larger than a predetermined value 603 (first predetermined value: see FIG. 6). If the in-view-angle object movement amount is equal to or larger than the predetermined value 603 (YES to the step S103), the controller 106 proceeds to a step S104, whereas if the in-view-angle object movement amount is smaller than the predetermined value 603 (NO to the step S103), the controller 106 proceeds to the step S112.

Here, the magnitude of the predetermined value 603 is only required to be a value at which it is possible to determine whether or not the main object is moving, as viewed from the image capturing apparatus 101, and is set to a value suitable for a use case.

For example, in the first use case, the predetermined value 603 is set to a value of a degree at which a hand-held camera shake of the image capturing apparatus 101 can be offset. With this, for example, in a case where a friend who is within the moving body 300a (for example, a train) is the main object 303, it is determined in the step S103 that the in-view-angle object movement amount is smaller than the predetermined value 603, and the process proceeds to the step S112.

Further, in the second use case, the predetermined value 603 is set to a value of a degree at which a positional deviation of the image capturing apparatus 101, caused when the moving body 300b (for example, a drone) is in a still state by hovering, can be offset. With this, for example, in a case where a mountain very far from the moving body 300b is the main object 303, it is determined in the step S103 that the in-view-angle object movement amount is smaller than the predetermined value 603, and the process proceeds to the step S112.

In the step S104, the controller 106 (switching unit) sets the pre-capture function to ON and proceeds to a step S105 to automatically set the pre-capture function.

In the step S105, the controller 106 (setting unit) automatically sets the pre-capture function according to the amount per unit time of movement of the main object 303 included in the angle of view. That is, the controller 106 automatically sets the pre-capture function according to the speed of apparent movement of the main object 303 viewed from the image capturing apparatus 101.

Details of the steps S103 and S105 will be described hereinafter.

In a step S106, the controller 106 determines whether or not the first shutter switch signal SW1 (first photographing instruction) has been received. If the first shutter switch signal SW1 has been received (YES to the step S106), the controller 106 proceeds to a step S107, whereas if the first shutter switch signal SW1 has not been received (NO to the step S106), the controller 106 proceeds to a step S118.

In the step S118, the controller 106 determines whether or not a predetermined time period has elapsed from a time point at which the pre-capture function was set to ON in the step S104. If the predetermined time period has elapsed (YES to the step S118), the controller 106 returns to the step S102, whereas if the predetermined time period has not elapsed yet (NO to the step S118), the controller 106 returns to the step S106.

In the step S107, the controller 106 transmits a control signal indicating an auto-focus start instruction to the image capturing section 107. Upon receipt of the control signal, the image capturing section 107 starts auto-focus processing and focuses on the main object 303.

In a step S108, the controller 106 transmits a control signal indicating a pre-capture start instruction for repeatedly executing image capturing control to the image capturing section 107 based on the pre-capture function set in the step S105. Upon receipt of the control signal, the image capturing section 107 starts the pre-capture. Further, pre-captured images are temporarily stored in the first recording section 109 while the pre-capture is continued.

In a step S109, the controller 106 determines whether or not the second shutter switch signal SW2 (second photographing instruction) has been received. If the second shutter switch signal SW2 has been received (YES to the step S109), the controller 106 proceeds to a step S110, whereas if the second shutter switch signal SW2 has not been received (NO to the step S109), the controller 106 proceeds to a step S119.

In the step S119, the controller 106 determines whether or not a predetermined time period has elapsed from a time point at which the pre-capture was started in the step S108. If the predetermined time period has elapsed (YES to the step S119), the controller 106 proceeds to a step S120, whereas if the predetermined time period has not elapsed yet (NO to the step S119), the controller 106 returns to the step S109.

In the step S120, the controller 106 transmits a control signal indicating a pre-capture-terminating instruction to the image capturing section 107. Upon receipt of the control signal, the image capturing section 107 terminates the pre-capture.

In a step S121 following the step S120, the controller 106 deletes the pre-captured images in the first recording section 109. Then, the controller 106 returns to the step S102.

In the step S110, the controller 106 transmits a control signal indicating a normal photographing execution instruction to the image capturing section 107. Upon receipt of the control signal, the image capturing section 107 executes normal photographing.

In a step S111, the controller 106 stores an image obtained through normal photographing and the pre-captured images buffered in the first recording section 109 in the second recording section 110. As for the pre-captured images buffered in the first recording section 109, all of the images can be stored in the second recording section 110 or some of the images can be extracted and stored in the second recording section 110. When the step S111 is completed, the controller 106 terminates the photographing process in FIG. 5.

In the step S112, the controller 106 (switching unit) sets the pre-capture function to OFF and proceeds to a step S113.

In the step S113, the controller 106 determines whether or not the first shutter switch signal SW1 (first photographing instruction) has been received. If the first shutter switch signal SW1 has been received (YES to the step S113), the controller 106 proceeds to a step S114, whereas if the first shutter switch signal SW1 has not been received (NO to the step S113), the controller 106 proceeds to a step S122.

In the step S122, the controller 106 determines whether or not a predetermined time period has elapsed from a time point at which the pre-capture function was turned off in the step S112. If the predetermined time period has elapsed (YES to the step S122), the controller 106 returns to the step S102, whereas if the predetermined time period has not elapsed yet (NO to the step S122), the controller 106 returns to the step S113.

In the step S114, the controller 106 transmits a control signal indicating an auto-focusing start instruction to the image capturing section 107. Upon receipt of the control signal, the image capturing section 107 starts auto-focus processing and focuses on the main object 303.

In a step S115, the controller 106 determines whether or not the second shutter switch signal SW2 (second photographing instruction) has been received. If the second shutter switch signal SW2 has been received (YES to the step S115), the controller 106 proceeds to a step S116, whereas if the second shutter switch signal SW2 has not been received (NO to the step S115), the controller 106 proceeds to a step S123.

In the step S123, the controller 106 determines whether or not a predetermined time period has elapsed from a time point at which the control signal indicating the auto-focusing start instruction was transmitted to the image capturing section 107 in the step S114. If the predetermined time period has elapsed (YES to the step S123), the controller 106 returns to the step S102, whereas if the predetermined time period has not elapsed yet (NO to the step S123), the controller 106 returns to the step S115.

In the step S116, the controller 106 transmits a control signal indicating the normal photographing execution instruction to the image capturing section 107. Upon receipt of the control signal, the image capturing section 107 executes the normal photographing.

In a step S117, the controller 106 stores the image obtained through the normal photographing in the second recording section 110. When the step S117 is completed, the controller 106 terminates the photographing process in FIG. 5.

Here, the ON/OFF-switching of the pre-capture function in the step S103 in FIG. 5, and the automatic setting of the pre-capture setting in the step S105 in FIG. 5, using the movement amount per unit time of the main object 303 included in the angle of view, will be described in detail with reference to FIG. 6.

Figure 6:
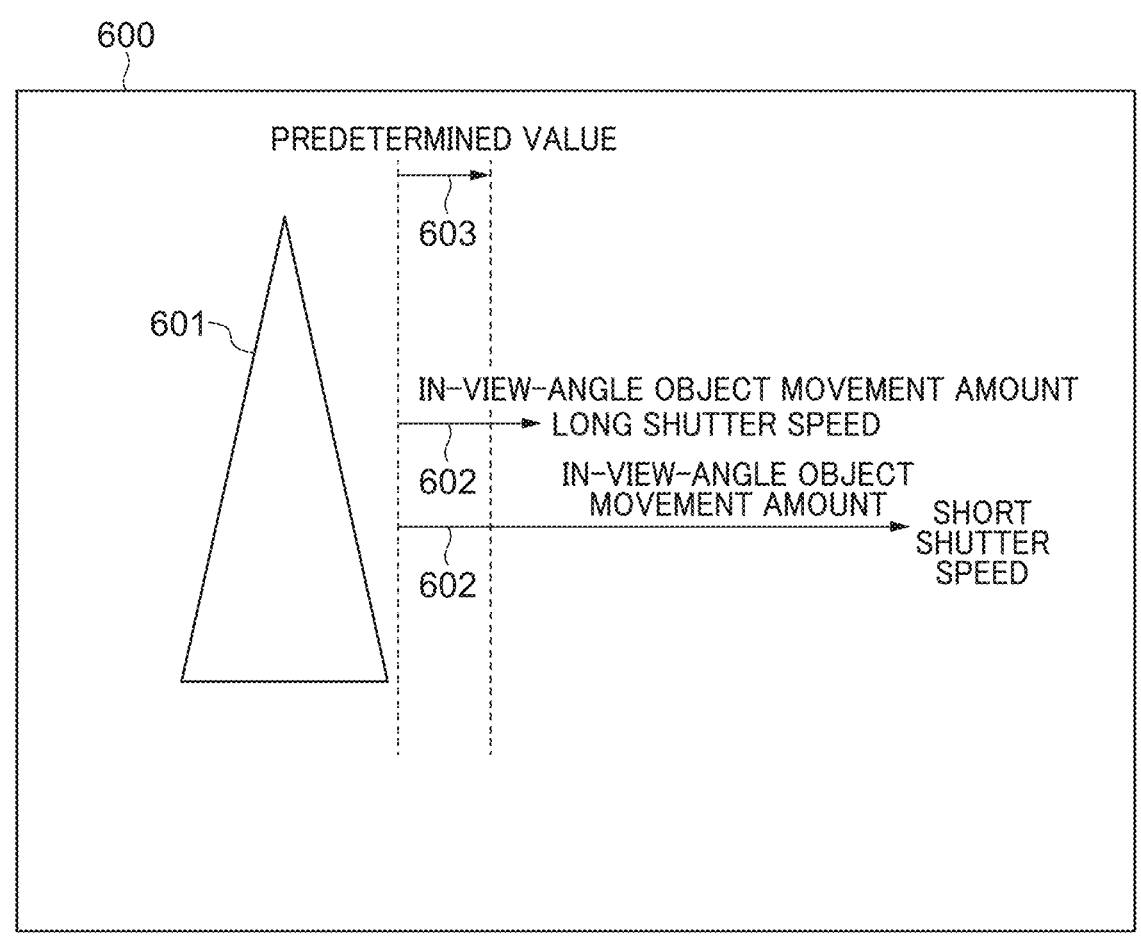
FIG. 6 is a diagram showing a state in which a main object is moving within an angle of view of the image capturing apparatus shown in FIG. 1.

FIG. 6 is a diagram showing a state in which a main object 601 is moving within a view angle 600 of the image capturing apparatus 101.

When the controller 106 proceeds to the step S103, the controller 106 sequentially acquires frame images captured at predetermined image capturing intervals and output from the image capturing section 107 through the live view image capturing started in the step S100. In the first use case, the photographer at this time adjusts the orientation of the image capturing apparatus 101 so as to cause the main object 303 desired to be photographed to be included in the angle of view of the image capturing apparatus 101 while confirming the live view image displayed on the second display section 112. On the other hand, in the second use case, the photographer operates the moving body 300b using the proportional system so as to cause the main object 303 desired to be photographed to be included in the angle of view of the image capturing apparatus 101 while confirming the live view image displayed on the first display section 111 of the photographing instruction device 400.

Let it be assumed that the main object 303 included in the view angle 600 is the main object 601 in the angle of view. Further, the main object 601 in the angle of view is moving in the view angle 600 with an in-view-angle object movement amount 602.

The in-view-angle object movement amount 602 of the main object 601 in the angle of view is calculated based on the predetermined image capturing interval in the live view image capturing and a movement amount of the main object 601 in the view angle 600, which is included in a plurality of frame images acquired through the live view image capturing. Further, the in-view-angle object movement amount 602 of the main object 601 in the angle of view depends on an actual movement distance of the image capturing apparatus 101, an actual movement distance of the main object 303, a distance between the image capturing apparatus 101 and the main object 303, a zoom magnification, and so forth. The in-view-angle object movement amount 602 represents an apparent speed of the main object 303 viewed from the image capturing apparatus 101 moving at the moving speed 301 together with the moving body 300.

Figure 5:
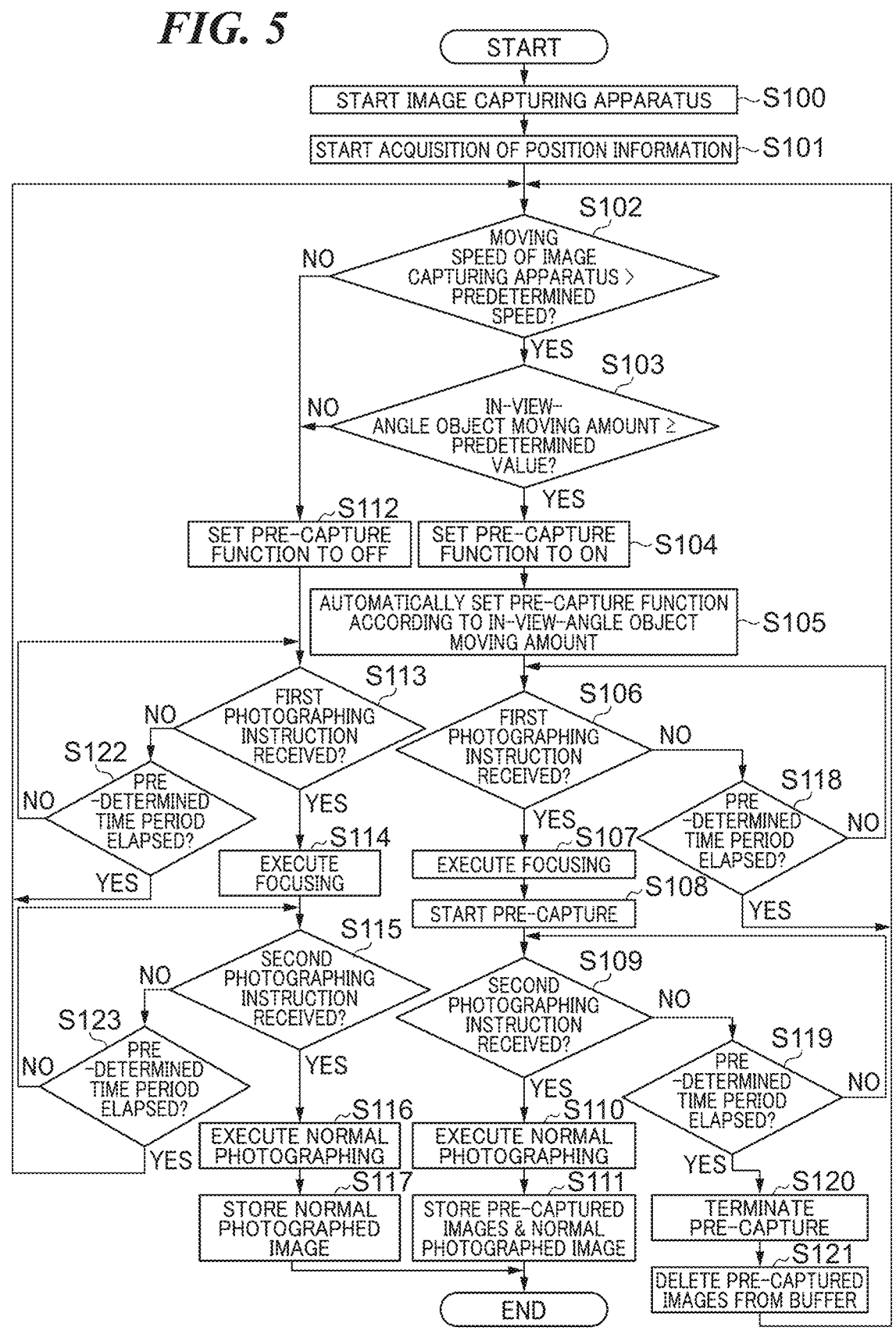
FIG. 5 is a flowchart of a photographing process performed by the image capturing apparatus shown in FIG. 1.

In the step S103 in FIG. 5, the controller 106 calculates the in-view-angle object movement amount 602 of the main object 601 in the angle of view. If the in-view-angle object movement amount 602 is equal to or larger than the predetermined value 603, the controller 106 proceeds to the step S104 in FIG. 5, whereas if the in-view-angle object movement amount 602 is smaller than the predetermined value 603, the controller 106 proceeds to the step S112 in FIG. 5. Depending on whether or not the in-view-angle object movement amount 602 is equal to or larger than the predetermined value 603, the controller 106 determines whether or not the main object 303 is moving as viewed from the image capturing apparatus 101, and based on a result of the determination, the controller 106 determines whether or not to enable the pre-capture function. However, the method of determining whether or not the main object 303 is moving as viewed from the image capturing apparatus 101 is not limited to this. A motion vector of the main object 303 in the angle of view can be used as the basis of the determination. In this case, the controller 106 calculates a motion vector of the main object 303 in the angle of view based on a plurality of frame images acquired by the image capturing section 107 through the live view image capturing. If the amount of the motion vector of the main object 601 in the view angle 600, shown in FIG. 6, is equal to or larger than a first predetermined amount, the controller 106 proceeds to the step S104 in FIG. 5, whereas if this amount is smaller than the first predetermined amount, the controller 106 proceeds to the step S112 in FIG. 5. With this, it is possible to determine whether or not the main object 303 is moving as viewed from the image capturing apparatus 101. In this case, in the step S105, the controller 106 automatically performs the setting of the pre-capture function according to the amount of the motion vector of the main object 601 in the angle of view. Specifically, the controller 106 sets a threshold value (second predetermined value) larger than the first predetermined amount in advance and sets a shutter speed at the time of pre-capture according to a result of comparison between the amount of the motion vector of the main object 601 and the threshold value. Note that although in the present embodiment, the shutter speed is used as an example of the automatically set setting of the pre-capture function, this is not limitative.

Note that in the photographing process in FIG. 5, it is necessary to detect the main object 303 and calculate the in-view-angle object movement amount in the step S103 before the controller 106 receives the first shutter switch signal SW1, i.e. before an operation of half-pressing the release switch 103 is performed by the photographer. Therefore, the image capturing apparatus 101 can be provided with an object detection section (object detection unit, not shown) that detects a specific object (a person, an animal, a vehicle or the like) from within an angle of view of the image capturing apparatus 101, such as a person detection function, an animal detection function, or a vehicle detection function. In this case, it is preferable to provide, immediately before the step S103, a step for quickly detecting the main object 303 using a result of detection performed by the object detection section. However, the detection method is not limited to the method of the present embodiment, but any other method can be employed insofar as it can quickly detect the main object 303.

In the step S105 in FIG. 5, the controller 106 automatically performs the setting of the pre-capture function according to the in-view-angle object movement amount 602 of the main object 601 in the angle of view. Specifically, the controller 106 sets the threshold value (second predetermined value) larger than the predetermined value 603 in advance, and if the in-view-angle object movement amount 602 is larger than the threshold value, the controller 106 sets a short shutter speed for pre-capture. On the other hand, if the in-view-angle object movement amount 602 is equal to or smaller than the threshold value, the controller 106 sets a long shutter speed for pre-capture. Although the shutter speed is used as an example of the automatically set setting of the pre-capture function, this is not limitative. For example, an aperture value, an ISO sensitivity, or the like can be included in the automatically set setting of the pre-capture function.

As described above, in the first embodiment, the photographing process in FIG. 5 is executed by the image capturing apparatus 101.

The advantageous effects obtained by the first embodiment will be described.

In the step S102 in FIG. 5, if the moving speed of the image capturing apparatus 101 is higher than the predetermined speed, in a case where the in-view-angle object movement amount 602 is equal to or larger than the predetermined value 603 in the step S103, the pre-capture function is set to ON, whereas if the moving speed of the image capturing apparatus 101 is lower than the predetermined speed, the pre-capture function is set to OFF. By performing the pre-capture when the image capturing apparatus 101 is moving in accordance with the movement of the moving body 300, it is possible to perform photographing without missing a photographing timing desired by the photographer 302.

In the step S103 in FIG. 5, in a case where the main object 303 is not moving as viewed from the image capturing apparatus 101, the pre-capture function is set to OFF. Therefore, even when the image capturing apparatus 101 is moving at a speed higher than the predetermined speed, in a case where the pre-capture is not needed, such as a case where a passenger in a vehicle is photographed, it is possible to perform photographing without pre-capture.

In the steps S102 and S103 in FIG. 5, switching-ON/OFF of the pre-capture function is automatically executed. Therefore, it is possible to eliminate a work which is troublesome for the photographer 302, such as a work of manually switching the pre-capture function on a menu screen e.g. in a moving vehicle or during operating a drone.

In a case where the image capturing apparatus 101 is in/on the moving body 300, such as a vehicle or drone which always changes in the moving speed 301, it is difficult for the photographer 302 to change the pre-capture setting every time by determining a suitable pre-capture setting. In the step S105 in FIG. 5, the controller 106 automatically sets the pre-capture setting according to a speed of apparent movement of the main object 303, and hence it is possible to continuously set the suitable pre-capture setting even in a case where the moving speed 301 always changes.

Note that although the propriety of the operation is not mentioned, the propriety of the operation can be selected by the photographer on a setting screen or the like.

Note that the first embodiment can be applied not only to the image capturing apparatus but also to e.g. a smartphone.

Next, a second embodiment of the present invention will be described. An image capturing apparatus 701 according to the second embodiment has the same configuration as that of the image capturing apparatus 101 except a point that a component corresponding to the position information acquisition section 102 of the image capturing apparatus 101 according to the first embodiment is not included. Therefore, in the present embodiment, as for components having the same name as those of the first embodiment, description of the components is omitted, and part unique to the present embodiment will be mainly described.

Figure 7:
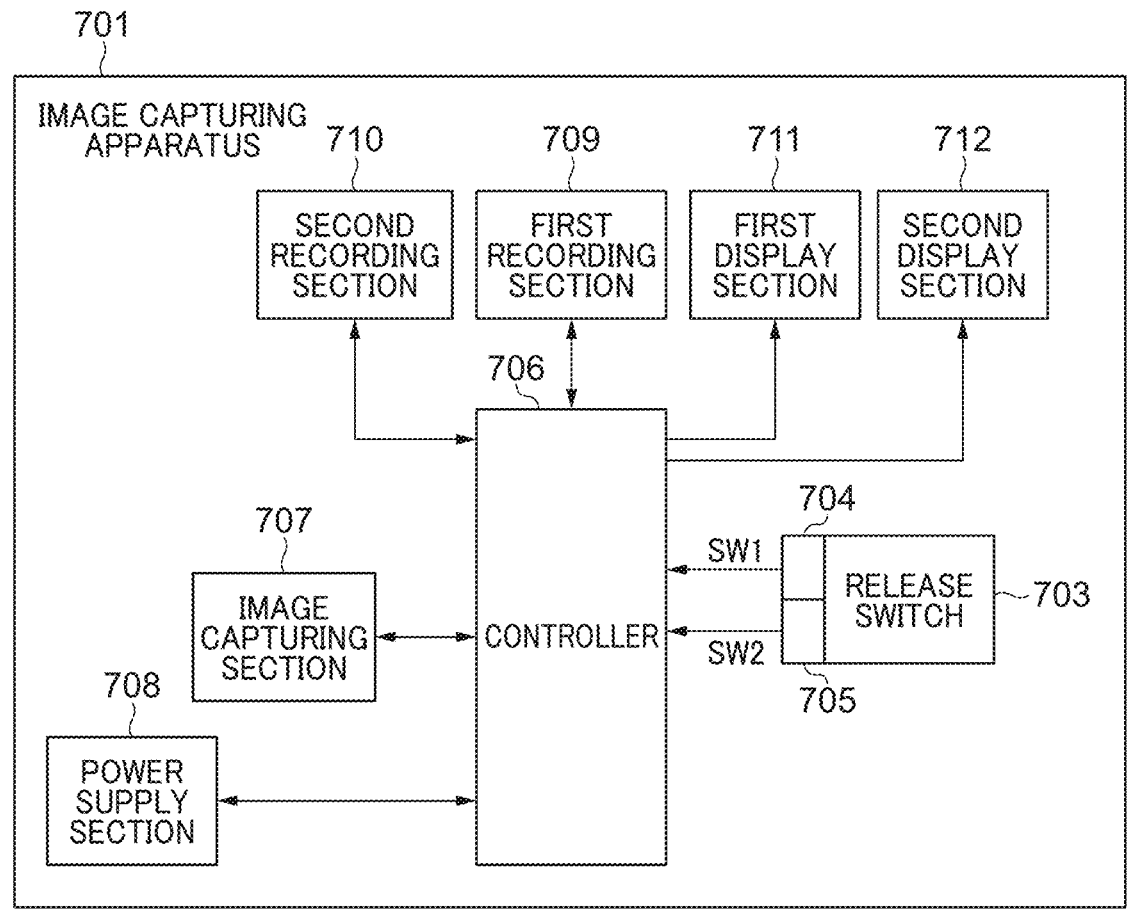
FIG. 7 is a block diagram showing a hardware configuration of an image capturing apparatus according to a second embodiment of the present invention.

FIG. 7 is a block diagram showing a hardware configuration of the image capturing apparatus 701 according to the second embodiment of the present invention.

The image capturing apparatus 701 includes a release switch 703, a first shutter switch 704, a second shutter switch 705, a controller 706, an image capturing section 707, a power supply section 708, a first recording section 709, a second recording section 710, a first display section 711, and a second display section 712.

The release switch 703, the first shutter switch 704, the second shutter switch 705, the image capturing section 707, the power supply section 708, the first recording section 709, the second recording section 710, the first display section 711, and the second display section 712 are the same as the components having the same names, appearing in FIG. 1, and hence description of these units is omitted.

The controller 706 is a controller that controls the entire system of the image capturing apparatus 701 and is implemented e.g. by a system LSI and a DRAM.

Further, the controller 706 performs control with respect to the release switch 703, the image capturing section 707, the power supply section 708, the first recording section 709, the second recording section 710, the first display section 711, and the second display section 712. Differently from the controller 106 of the first embodiment, a component corresponding to the position information acquisition section 102 is not provided, and hence the controller 706 does not receive a position information signal from the outside and perform processing or the like based on the received signal.

Upon receipt of the first shutter switch signal SW1 or second shutter switch signal SW2 from the release switch 703, the controller 706 outputs a control signal to the image capturing section 707. With this control signal, the controller 706 provides e.g. a photographing instruction to the image capturing section 707. Differently from the controller 106 of the first embodiment, the controller 706 does not receive the position information signal from the position information acquisition section 102.

The exterior components of the image capturing apparatus 701 are the same as those of the first embodiment as described with reference to FIG. 2, and hence description thereof is omitted.

The use cases are also the same as those of the first embodiment shown in FIGS. 3 and 4, and hence description thereof is omitted.

A photographing process performed by the image capturing apparatus 701 will be described below with reference to FIG. 8.

The present process is executed by the controller 706 reading a program from the second recording section 710 and loading the program into the DRAM in the controller 706.

In a step S200, when it is detected that the photographer has pressed a power switch (not shown) of the image capturing apparatus 701, the controller 706 starts the image capturing apparatus 701 and causes the image capturing section 707 (live view image capturing unit) to start live view image capturing, whereafter the process proceeds to a step S202. That is, in the present photographing process, differently from the photographing process according to the first embodiment, processing corresponding to the step S101 is not present.

In the step S202, first, the controller 706 sequentially acquires frame images output from the image capturing section 707, which are captured at predetermined image capturing intervals by the live view image capturing started in the step S200. Next, the controller 706 (vector calculation unit) calculates motion vectors of respective objects in the angle of view based on the plurality of acquired frame images and determines whether or not the calculated motion vectors are in the same direction. Specifically, in a case where a predetermined number or more of objects, whose motion vectors each have a magnitude equal to or larger than a predetermined value and are in the same direction, are present in the angle of view, it is determined that the calculated motion vectors are in the same direction. If the calculated motion vectors are in the same direction (YES to the step S202), the controller 706 (switching unit) determines that the image capturing apparatus 701 is moving in accordance with the movement of the moving body 300 and proceeds to a step S203. On the other hand, if the calculated motion vectors are not in the same direction (NO to the step S202), the controller 706 determines that the image capturing apparatus 701 is not moving in accordance with the movement of the moving body 300 and proceeds to a step S212.

Details of the step S202 will be described hereinafter.

Figure 8:
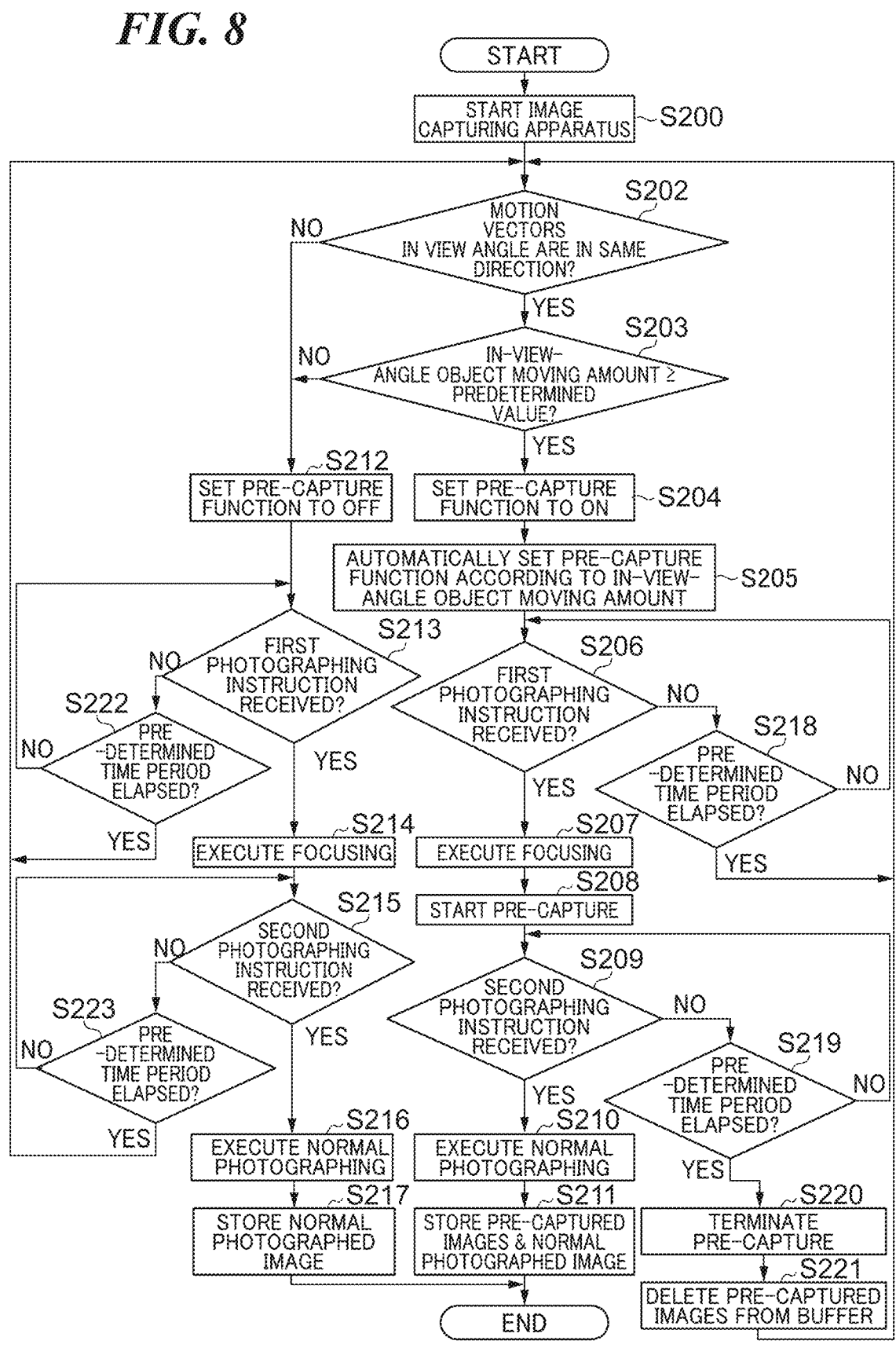
FIG. 8 is a flowchart of a photographing process performed by the image capturing apparatus shown in FIG. 7.

In the steps S203 to S223 as the rest of the process in FIG. 8, the same processing operations as the steps S103 to S123 in FIG. 5 are executed.

Here, the method of determining in the step S202 in FIG. 8 whether or not the image capturing apparatus 701 is moving in accordance with the movement of the moving body 300 and determining whether or not to execute pre-capture based on a result of this determination will be described with reference to FIG. 9.

Figure 9:
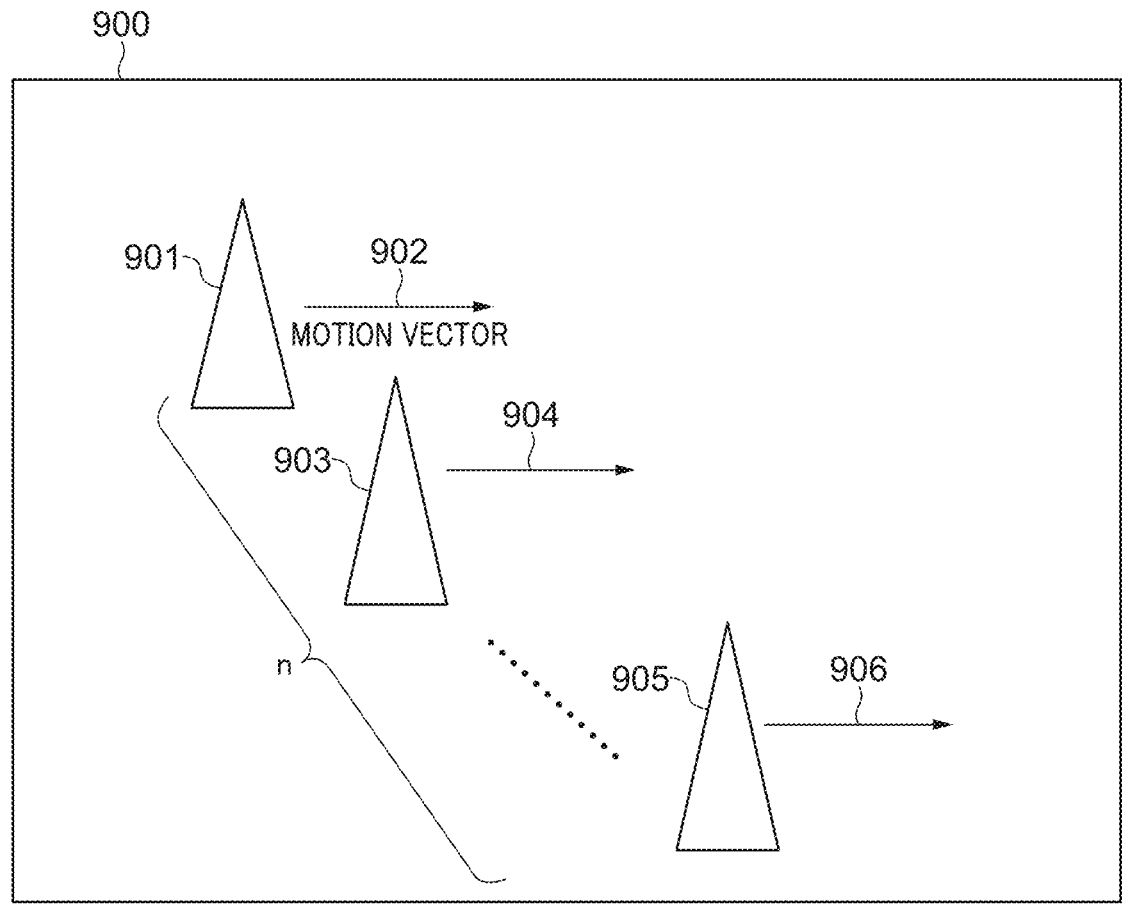
FIG. 9 is a diagram showing a state in which a plurality of objects are moving within an angle of view of the image capturing apparatus shown in FIG. 7.

FIG. 9 is a diagram showing a state in which a plurality of objects 901, 903, and 905 are moving within a view angle 900 of the image capturing apparatus 701.

The object 901 included in the view angle 900 is moving with a motion vector 902, as viewed from the image capturing apparatus 701.

The object 903 included in the view angle 900 is moving with a motion vector 904, as viewed from the image capturing apparatus 701.

The object 905 included in the view angle 900 is moving with a motion vector 906, as viewed from the image capturing apparatus 701.

In the step S202 in FIG. 8, the controller 706 calculates respective motion vectors of n objects within the view angle based on a plurality of frame images output from the image capturing section 707 by the live view image capturing. The frame images used for the calculation can be successive frame images or frame images extracted every several frames. If the number of motion vectors of the calculated motion vectors, which each have a magnitude equal to or larger than the predetermined value and are in the same direction, is equal to or larger than the predetermined number, the controller 706 proceeds to the step S203 in FIG. 8, whereas if the number of corresponding motion vectors is smaller than the predetermined number, the controller 706 proceeds to the step S212 in FIG. 8.

When the image capturing apparatus 701 is moving at the moving speed 301 in accordance with the movement of the moving body 300, an object which is still and outside seems to be moving at the moving speed 301 in an opposite direction from the image capturing apparatus 701 as viewed from the image capturing apparatus 701. Therefore, in a case where a predetermined number or more of objects, whose motion vectors each have a magnitude equal to or larger than the predetermined value and are in the same direction, are present in the view angle 900, the controller 706 determines that the image capturing apparatus 701 is moving in accordance with the movement of the moving body 300 in a direction opposite to the direction of the motion vectors.

As described above, in the second embodiment, the photographing process in FIG. 8 is executed by the image capturing apparatus 701.

The advantageous effects obtained by the second embodiment will be described.

In a case where it is determined in the step S202 in FIG. 8, based on the directions and magnitudes of the motion vectors of objects included in the view angle 900, that the image capturing apparatus 701 is moving in accordance with the movement of the moving body 300, the pre-capture is performed. With this, it is possible to perform photographing without missing the photographing timing desired by the photographer 302. Further, the determination performed in the step S202 does not require the position information signal output from the position information acquisition section 102. This enables the image capturing apparatus 701 not provided with the position information acquisition section 102 to perform the photographing process in FIG. 8, and it is possible to apply the second embodiment to image capturing apparatuses in a wider range than in the first embodiment.

The steps S202 and S203 in FIG. 8 automatically executes switching-ON/OFF of the pre-capture function. This makes it possible to eliminate a work of manually switching the pre-capture function on the menu screen in a moving vehicle or during operation of a drone, which is troublesome for the photographer 302.

Further, the steps S203 to S223 in FIG. 8 in the second embodiment are the same as the steps S103 to S123 in the first embodiment, and hence also in the second embodiment, it is also possible to obtain all of the advantageous effects provided by the steps S103 to S123.

Note that although the propriety of the operation is not mentioned, the propriety of the operation can be selected by the photographer on a setting screen or the like.

Note that the second embodiment can be applied not only to the image capturing apparatus but also to e.g. a smartphone.

Note that in the present embodiment, the present invention can also be realized by supplying a program that realizes one or more functions to a system or a computer of an apparatus via a network or a storage medium, and performing a process for loading and executing the program by the system or a system controller of the apparatus. The system controller can have one or a plurality of processors or circuits and can include a network of a plurality of separate system controllers or a plurality of separate processors or circuits to load and execute an executable command.

The processor or circuit can include a central processing unit (CPU), a micro processing unit (MPU), a graphics processing unit (GPU), an application-specific integrated circuit (ASIC), and a field programmable gate array (FPGA). Further, the processor or circuit can include a digital signal processor (DSP), a data flow processor (DFP), or a neural processing unit (NPU).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-097838 filed Jun. 14, 2023, which is hereby incorporated by reference herein in its entirety.

What is claimed is:

1. An image capturing apparatus having a pre-capture function, comprising:
a live view image capturing unit configured to acquire a plurality of frame images each captured at a predetermined image capturing interval by live view image capturing,
at least one processor; and
a memory coupled to the at least one processor storing instructions that, when executed by the processor, cause the processor to function as:
a position information acquisition unit configured to acquire position information of the image capturing apparatus;
a moving speed calculation unit configured to calculate a moving speed of the image capturing apparatus based on the position information;
a switching unit configured to switch the pre-capture function to ON in a case where the moving speed is equal to or higher than a predetermined speed,
configured to calculate a motion vector of a main object included in an angle of view of the image capturing apparatus based on the plurality of frame images, and to determine, in a case where an amount of the motion vector is smaller than a first predetermined amount, that the main object is not moving as viewed from the image capturing apparatus, and
configured to set, in a case where it is determined that the main object is not moving as viewed from the image capturing apparatus, the pre-capture function to OFF; and a setting unit configured to compare the amount of the motion vector and a second predetermined amount larger than the first predetermined amount, and to perform setting of the pre-capture function according to a result of the comparison.

2. The image capturing apparatus according to claim 1, wherein the switching unit calculates a movement amount per unit time of the main object included in the angle of view of the image capturing apparatus, based on the predetermined image capturing interval and a movement amount of the main object in the angle of view captured in the plurality of frame images, and determines, in a case where the movement amount per unit time is smaller than a first predetermined value, that the main object is not moving as viewed from the image capturing apparatus.

3. The image capturing apparatus according to claim 2, wherein the setting unit compares the movement amount per unit time and a second predetermined value larger than the first predetermined value and perform setting of the pre-capture function according to a result of the comparison.

4. The image capturing apparatus according to claim 3, wherein the setting unit sets a shutter speed of the image capturing apparatus at the time of pre-capture.

5. The image capturing apparatus according to claim 1, wherein the setting unit sets a shutter speed of the image capturing apparatus at the time of pre-capture.

6. The image capturing apparatus according to claim 1, wherein the image capturing apparatus is mounted on a moving body and wirelessly connected to an external photographing instruction device, and
wherein the photographing instruction device includes a reception unit configured to receive respective user operations for a pre-capture start instruction and a normal photographing instruction, and
wherein in a case where the pre-capture function is set to ON,
the image capturing apparatus starts pre-capture upon receipt of the pre-capture start instruction by an associated one of the user operations from the photographing instruction device, and
performs normal photographing upon receipt of the normal photographing instruction based on an associated one of the user operations from the photographing instruction device.

7. The image capturing apparatus according to claim 6, wherein the photographing instruction device further includes a display unit configured to display a live view image received from the image capturing apparatus.

8. The image capturing apparatus according to claim 1, further comprising an object detection unit configured to detect a specific object from within an angle of view of the image capturing apparatus, and
wherein the switching unit detects the main object included in the angle of view using a result of the detection performed by the object detection unit.

9. An image capturing apparatus having a pre-capture function, comprising:
a live view image capturing unit configured to acquire a plurality of frame images each captured at a predetermined image capturing interval by live view image capturing;
at least one processor; and
a memory coupled to the at least one processor storing instructions that, when executed by the processor, cause the processor to function as:

17
18 a vector calculation unit configured to calculate respective motion vectors of a plurality of objects included in an angle of view of the image capturing apparatus based on the plurality of frame images; and a switching unit configured to switch the pre-capture function to ON in a case where out of the calculated motion vectors, a predetermined number or more of motion vectors each have a magnitude equal to or larger than a predetermined value and are in the same direction.

10. The image capturing apparatus according to claim 9, wherein in a case where it is determined that a main object is not moving as viewed from the image capturing apparatus, the switching unit sets the pre-capture function to OFF.

11. The image capturing apparatus according to claim 10, wherein the switching unit calculates a movement amount per unit time of the main object included in the angle of view of the image capturing apparatus, based on the predetermined image capturing interval and a movement amount of the main object in the angle of view, which is included in the plurality of frame images, and determines, in a case where the movement amount per unit time is smaller than a first predetermined value, that the main object is not moving as viewed from the image capturing apparatus.

12. The image capturing apparatus according to claim 11, further comprising a setting unit configured to compare the movement amount per unit time and a second predetermined value larger than the first predetermined value and perform setting of the pre-capture function according to a result of the comparison.

13. The image capturing apparatus according to claim 11, wherein the setting unit sets a shutter speed of the image capturing apparatus at the time of pre-capture.

14. The image capturing apparatus according to claim 10, wherein the switching unit calculates a motion vector of the main object included in the angle of view of the image capturing apparatus based on the plurality of frame images, and determines, in a case where an amount of the motion vector is smaller than a first predetermined amount, that the main object is not moving as viewed from the image capturing apparatus.

15. The image capturing apparatus according to claim 14, further comprising a setting unit configured to compare the amount of the motion vector and a second predetermined amount larger than the first predetermined amount and perform setting of the pre-capture function according to a result of the comparison.

16. The image capturing apparatus according to claim 15, wherein the setting unit sets a shutter speed of the image capturing apparatus at the time of pre-capture.

17. The image capturing apparatus according to claim 9, further comprising a reception unit configured to receive respective user operations for a pre-capture instruction and a normal photographing instruction in a case where the pre-capture function is set to ON.

18. The image capturing apparatus according to claim 9, wherein the image capturing apparatus is mounted on a moving body and wirelessly connected to an external photographing instruction device, and further comprises a reception unit configured to receive respective user operation for a pre-capture start instruction and a normal photographing instruction, and wherein in a case where the pre-capture function is set to ON, the image capturing apparatus starts pre-capture upon receipt of the pre-capture start instruction based on an associated one of the user operations from the photographing instruction device, and performs normal photographing upon receipt of the normal photographing instruction based on an associated one of the user operations from the photographing instruction device.

19. The image capturing apparatus according to claim 18, wherein the photographing instruction device further includes a display unit configured to display a live view image received from the image capturing apparatus.

20. The image capturing apparatus according to claim 19, further comprising an object detection unit configured to detect a specific object from within the angle of view of the image capturing apparatus, and wherein the switching unit detects the main object included in the angle of view using a result of the detection performed by the object detection unit.

21. A method of controlling an image capturing apparatus having a pre-capture function, comprising:

acquiring a plurality of frame images each captured at a predetermined image capturing interval by live view image capturing;

acquiring position information of the image capturing apparatus;

calculating a moving speed of the image capturing apparatus based on the position information;

switching the pre-capture function to ON in a case where the moving speed is equal to or higher than a predetermined speed, calculating a motion vector of a main object included in an angle of view of the image capturing apparatus based on the plurality of frame images, and determining, in a case where an amount of the motion vector is smaller than a first predetermined amount, that the main object is not moving as viewed from the image capturing apparatus, setting, in a case where it is determined that the main object is not moving as viewed from the image capturing apparatus, the pre-capture function to OFF, and comparing the amount of the motion vector and a second predetermined amount larger than the first predetermined amount, and performing setting of the pre-capture function according to a result of the comparison.

22. A method of controlling an image capturing apparatus having a pre-capture function, comprising:

acquiring a plurality of frame images each captured at a predetermined image capturing interval by live view image capturing;

calculating respective motion vectors of a plurality of objects included in an angle of view of the image capturing apparatus based on the plurality of frame images; and switching the pre-capture function to ON in a case where out of the calculated motion vectors, a predetermined number or more of motion vectors each have a magnitude equal to or larger than a predetermined value and are in the same direction.

23. A non-transitory computer-readable storage medium storing a program for causing a computer to execute a method of controlling an image capturing apparatus having a pre-capture function, wherein the method comprises:

acquiring a plurality of frame images each captured at a predetermined image capturing interval by live view image capturing;

acquiring position information of the image capturing apparatus;

calculating a moving speed of the image capturing apparatus based on the position information; and switching the pre-capture function to ON in a case where the moving speed is equal to or higher than a predetermined speed;

calculating a motion vector of a main object included in an angle of view of the image capturing apparatus based on the plurality of frame images, and determining, in a case where an amount of the motion vector is smaller than a first predetermined amount, that the main object is not moving as viewed from the image capturing apparatus;

setting, in a case where it is determined that the main object is not moving as viewed from the image capturing apparatus, the pre-capture function to OFF; and comparing the amount of the motion vector and a second predetermined amount larger than the first predetermined amount, and performing setting of the pre-capture function according to a result of the comparison.

24. A non-transitory computer-readable storage medium storing a program for causing a computer to execute a method of controlling an image capturing apparatus having a pre-capture function, wherein the method comprises:

acquiring a plurality of frame images each captured at a predetermined image capturing interval by live view image capturing;

calculating respective motion vectors of a plurality of objects included in an angle of view of the image capturing apparatus based on the plurality of frame images; and switching the pre-capture function to ON in a case where out of the calculated motion vectors, a predetermined number or more of motion vectors each have a magnitude equal to or larger than a predetermined value and are in the same direction.

* * * * *